(12) United States Patent
Matsumoto

(10) Patent No.: US 11,933,274 B2
(45) Date of Patent: Mar. 19, 2024

(54) LIGHTNING SUPPRESSION-TYPE WIND POWER GENERATION EQUIPMENT

(71) Applicant: LIGHTNING SUPPRESSION SYSTEMS CO., LTD., Yokohama (JP)

(72) Inventor: Toshio Matsumoto, Kanagawa (JP)

(73) Assignee: Lightning Suppression Systems Co., Ltd., Kanagawa (JP)

( * ) Notice: Subject to any disclaimer, the term of this patent is extended or adjusted under 35 U.S.C. 154(b) by 0 days.

(21) Appl. No.: 18/248,125

(22) PCT Filed: Oct. 4, 2021

(86) PCT No.: PCT/JP2021/036548
§ 371 (c)(1),
(2) Date: Jun. 23, 2023

(87) PCT Pub. No.: WO2022/075237
PCT Pub. Date: Apr. 14, 2022

(65) Prior Publication Data
US 2023/0374975 A1    Nov. 23, 2023

(30) Foreign Application Priority Data
Oct. 9, 2020    (JP) ................................ 2020-171541

(51) Int. Cl.
*F03D 80/30*    (2016.01)
*F03D 80/80*    (2016.01)

(52) U.S. Cl.
CPC ............. *F03D 80/30* (2016.05); *F03D 80/82* (2016.05); *F05B 2240/307* (2020.08)

(58) Field of Classification Search
CPC ...... F03D 80/30; F03D 80/82; F05B 2240/307
See application file for complete search history.

(56) References Cited

U.S. PATENT DOCUMENTS 10,316,827 B2 *    6/2019    Livingston ............ F03D 1/0675
11,594,869 B2 *    2/2023    Matsumoto ............ H02G 13/40
(Continued)

FOREIGN PATENT DOCUMENTS

| JP | 5839331 B | 1/2016 |
|----|-----------|--------|
| JP | 2019-083168 | 5/2019 |

OTHER PUBLICATIONS

International Search Report issued in International Application No. PCT/JP2021/036548, dated Oct. 26, 2021, 6 pages w/translation.

*Primary Examiner* — Igor Kershteyn
(74) *Attorney, Agent, or Firm* — HSML, P.C.

(57) ABSTRACT

A wind power generation facility capable of realizing a lightning strike suppression effect while maintaining power generation efficiency by maintaining a blade shape that greatly affects power generation efficiency. An erected support column, a generator G provided at an upper portion of the support column, a hub H provided on a drive shaft that rotationally drives the generator, a plurality of blades radially provided to the hub about the drive shaft, charged bodies provided at tips of the blades, and a capacitor provided in an inner space of the hub are provided, and the capacitor includes a first electrode body that is grounded and a second electrode body that faces the first electrode body with an electrically insulating layer interposed therebetween and connected to the charged bodies.

8 Claims, 7 Drawing Sheets

(56) References Cited

U.S. PATENT DOCUMENTS

| | | | |
|---|---|---|---|
| 2009/0272557 A1* | 11/2009 | Mogensen | F03D 13/22 |
| | | | 174/2 |
| 2010/0129216 A1 | 5/2010 | Bagepalli et al. | |
| 2010/0284118 A1* | 11/2010 | Chung | H02G 13/60 |
| | | | 361/117 |
| 2013/0100570 A1* | 4/2013 | Lyngby | F03D 80/30 |
| | | | 361/117 |
| 2014/0119919 A1* | 5/2014 | Naka | F03D 13/10 |
| | | | 416/147 |
| 2020/0352014 A1 | 11/2020 | Matsumoto | |

* cited by examiner

LIGHTNING SUPPRESSION-TYPE WIND POWER GENERATION EQUIPMENT

TECHNICAL FIELD

The present invention relates to a lightning strike suppression type wind power generation facility having a function of suppressing a lightning strike on the wind power generation facility and protecting the wind power generation facility from a lightning damage.

BACKGROUND ART

The lightning strike is an electric discharge phenomenon occurring in the atmosphere, and examples of the lightning discharge include intra-cloud discharge, inter-cloud discharge, and cloud-ground discharge. A cloud-ground discharge (hereinafter referred to as a lightning strike) causes great damage by lightning discharge. A lightning strike is a natural phenomenon that occurs when the electric field intensity of a thundercloud (cloud bottom) and the ground or a structure constructed on the ground becomes very high and exceeds the dielectric breakdown strength of the atmosphere.

As a detailed observation result of this lightning strike phenomenon, it has been reported that the following phenomenon has occurred.

In the case of a general lightning strike (summer lightning) occurring in the summer season, when the thundercloud matures, the stepped leader approaches the ground from the thundercloud while selecting a place in the atmospheric air where electric discharge is easier.

When the stepped leader reaches a certain distance from the ground, an upward streamer (pick-up discharge) of a weak current extends from the ground or a building (lightning rod), a tree, or the like toward the stepped leader.

When the streamer and the stepped leader are coupled, a large current (return current) flows between the thundercloud and the ground through that path.

This is a lightning strike phenomenon.

With respect to such a lightning strike phenomenon, in the conventional lightning protection concept, from the viewpoint that a lightning strike cannot be prevented, a lightning strike is received by a guide-needle type lightning rod (Franklin rod) and caused to flow to the ground in most methods.

In regard of this, the present inventors have proposed a lightning strike suppression device disclosed in Patent Literature 1 in order to protect a protection target body by suppressing occurrence of a lightning strike as much as possible.

This lightning strike suppression device includes an upper electrode body and a lower electrode body disposed with an electrical insulator interposed therebetween, and is configured by grounding only the lower electrode body.

Then, for example, when a thundercloud in which negative charges are distributed on the cloud bottom approaches, charges (positive charges) opposite to the negative charges are distributed on the surface of the ground, and the lower electrode body grounded is also charged with positive charges.

Since the upper electrode body is disposed on the lower electrode body with an insulator including an air layer interposed therebetween, the upper electrode body and the lower electrode body function as a capacitor in which the lower electrode body is grounded.

As a result, the charge that generates the pick-up discharge is suppressed from flowing from the surface of the ground to the upper surface of the upper electrode body until the discharge breakdown of the capacitor occurs, and the pick-up discharge that causes the lightning strike is suppressed.

With such an action, it is possible to suppress the occurrence of the above-described upward streamer between the lightning strike suppression device and the thundercloud and to suppress the occurrence of the lightning strike.

CITATION LIST

Patent Literature

Patent Literature 1: JP 5839331

SUMMARY OF INVENTION

Technical Problem

According to the previous proposal by the present inventors and the like described above, it has become possible to suppress a lightning strike in a protection area centered on the lightning strike suppression device.

Incidentally, in recent years, a wind power generation facility has been mentioned as a power generation apparatus for renewable energy.

The wind power generation facility has a configuration in which a generator covered with a nacelle is installed at an upper portion of a support column, and a plurality of blades for rotationally driving the generator is attached to the generator. The blades have a length of more than 60 m in a large size.

As described above, since the upper portion of the wind power generation facility is located at a position close to the thundercloud, and in particular, the tip of the blade approaches the position closest to the thundercloud by rotating, the tip of the blade is likely to be struck by lightning.

Therefore, in order to suppress the lightning strike on the wind power generation facility, it is effective to provide the above-described lightning strike suppression function to the tip of the blade.

In this regard, in recent wind power generation facilities, there is one in which a lightning receiving unit of a lightning rod type is provided at a tip portion of a blade, but it cannot be said as an effective countermeasure from the viewpoint of suppressing lightning strike.

Meanwhile, the blades are designed to be shaped to efficiently convert the energy of wind power into rotational motion.

In addition, when the lightning strike suppression function is imparted to the blades, it is necessary to incorporate various devices for realizing the lightning strike suppression function in the blades, but in order to prevent a decrease in motion conversion efficiency of the blades, it is necessary to suppress a change in the position of the center of gravity caused by a change in the shape or weight of the blade.

Furthermore, since this wind power generation facility is a large structure including the blades, it is necessary to sufficiently consider the productivity, maintainability, and the like.

The present invention has been made in view of the above-described conventional demand, and an object of the present invention is to provide a wind power generation facility capable of realizing a lightning strike suppression effect while preventing a decrease in the power generation efficiency in the wind power generation facility and having excellent productivity, maintainability, and the like.

Solution to Problem

In order to solve the above-described problem, a wind power generation facility of the present invention includes an erected support column; a generator provided at an upper portion of the support column; a hub provided on a drive shaft that rotationally drives the generator; a plurality of blades radially provided to the hub about the drive shaft; charged bodies provided at tips of the blades; and a capacitor provided in an inner space of the hub, and the capacitor includes a first electrode body that is grounded and a second electrode body that faces the first electrode body with an electrically insulating layer interposed therebetween and connected to the charged bodies.

With such a configuration, for example, in a case where the support column is erected on the ground, when a thundercloud in which negative charges are distributed on the cloud bottom approaches the wind power generation facility, charges (positive charges) opposite thereto are distributed on the surface of the ground, and similarly, the first electrode body that is grounded and constitutes a part of the capacitor is also charged with positive charges.

Since the second electrode body faces the first electrode body with the electrically insulating layer (air layer) therebetween, the second electrode body is charged with negative charges by the function of the capacitor.

The charged bodies electrically connected to the second electrode body charged with negative charges are also charged with negative charges.

As described above, when the tip of the blade and the cloud bottom have the same charges, the pick-up discharge from the tip of the blade toward the thundercloud, which causes the occurrence of lightning strike, is suppressed until the discharge breakdown of the capacitor occurs.

As a result of such an effect, the upward streamer from the vicinity of the tip of the blade positioned highest is less likely to be generated, and the lightning strike on the blade and the surroundings thereof is suppressed.

In the present invention, the capacitor constituting the main part of the device for suppressing the generation of the pick-up discharge described above is installed in the inner space of the hub.

Here, since the inner space of the hub is usually a dead space, it is possible to install the device without providing a new installation space.

Further, installation can be performed without processing the blade.

Furthermore, since the device for suppressing lightning strike can be positioned on the rotation center line of the drive shaft rotated by the hub, that is, the blades, the rotation center of the device and the rotation center of the drive shaft can be easily matched.

As a result, rattling of the drive shaft caused by the deviation of the center of gravity of the device from the center of gravity of the drive shaft can be suppressed, and the rotation of the blades about the drive shaft as the rotation center can be made smooth.

As a result, it is possible to ensure a lightning strike suppression effect while preventing a decrease in the energy conversion efficiency of the blades, that is, a decrease in the power generation efficiency.

The capacitor can be configured by causing the first electrode body and the second electrode body to face each other while forming the electrically insulating layer including an air layer therebetween by forming the first electrode body and the second electrode body of a conductive material and in cylindrical shapes having different diameters and arranging the first electrode body and the second electrode body coaxially.

With such a configuration, by using air having a high insulating effect as the electrically insulating layer, charges can be reliably charged to each electrode body.

In addition, by forming the electrically insulating layer of the air layer, it is possible to reduce the number of constituent members of the capacitor, that is, to reduce the use amount of the electrical insulator, thereby reducing the cost of the capacitor. Furthermore, it is also good in terms of productivity.

In the present invention, the capacitor can also be configured by forming the first electrode body and the second electrode body each in a plate shape using a conductive material, disposing the first electrode body and the second electrode body coaxially with each other at an interval, and forming the electrically insulating layer between the first electrode body and the second electrode body.

With such a configuration, in addition to the above effects, it is possible to produce the capacitor itself simply and at a lower cost.

The electrically insulating layer can be formed by forming a unit capacitor by holding a pair of unit electrode bodies formed of a conductive material at a predetermined interval by an electrical insulator formed of an electrically insulating material, disposing a plurality of the unit capacitors between facing surfaces of the first electrode body and the second electrode body, fixing one unit electrode body of the unit capacitor to the first electrode body in a conductive state, and fixing the other unit electrode body of the unit capacitor to the second electrode body in a conductive state.

With such a configuration, the first electrode body and the second electrode body can be firmly coupled at a uniform interval to reliably form the electrically insulating layer, and the rigidity of the capacitor can be enhanced.

The unit capacitor can be formed by forming an air layer between two unit electrode bodies in a cylindrical holding body by fixing the unit electrode bodies formed of a conductive material to respective ends of the cylindrical holding body formed of an electrically insulating material.

The cylindrical holding body is made of ceramics, for example.

It is preferable that the plurality of unit capacitors is radially arranged between the first electrode body and the second electrode body about the center line thereof.

With such a configuration, the electrostatic capacitance can be increased by adding the electrostatic capacitance of the unit capacitors in addition to the electrostatic capacitance of the capacitor constituted by the first electrode body and the second electrode body, and the unit capacitors can be effectively disposed in the air layer formed between the first electrode body and the second electrode body. Furthermore, the weight of the unit capacitors can be easily and uniformly distributed around the rotation center of the drive shaft, and the rotation of the blades and the drive shaft can be made smooth.

In the present invention, an inspection port communicating with a connection portion between the hub and the blades may be formed in the first electrode body and the second electrode body.

With such a configuration, it is made possible to access the connection portion between the hub and the blades hidden by installing the capacitor in the hub, thereby facilitating maintenance and inspection thereof.

To be noted, as a method for grounding the first electrode body, it is preferable to adopt a method of imparting conductivity to the support column itself and grounding via the support column, a method using a grounding wire, or the like.

Advantageous Effects of Invention

According to the wind power generation facility of the present invention, it is possible to eliminate a change in a shape and a position of a center of gravity of a blade by eliminating processing of the blade, and thereby to exhibit a lightning strike suppression function while maintaining power generation efficiency.

DESCRIPTION OF EMBODIMENTS

Hereinafter, a first embodiment of the present invention will be described with reference to FIGS. 1 to 4.

Figure 1:
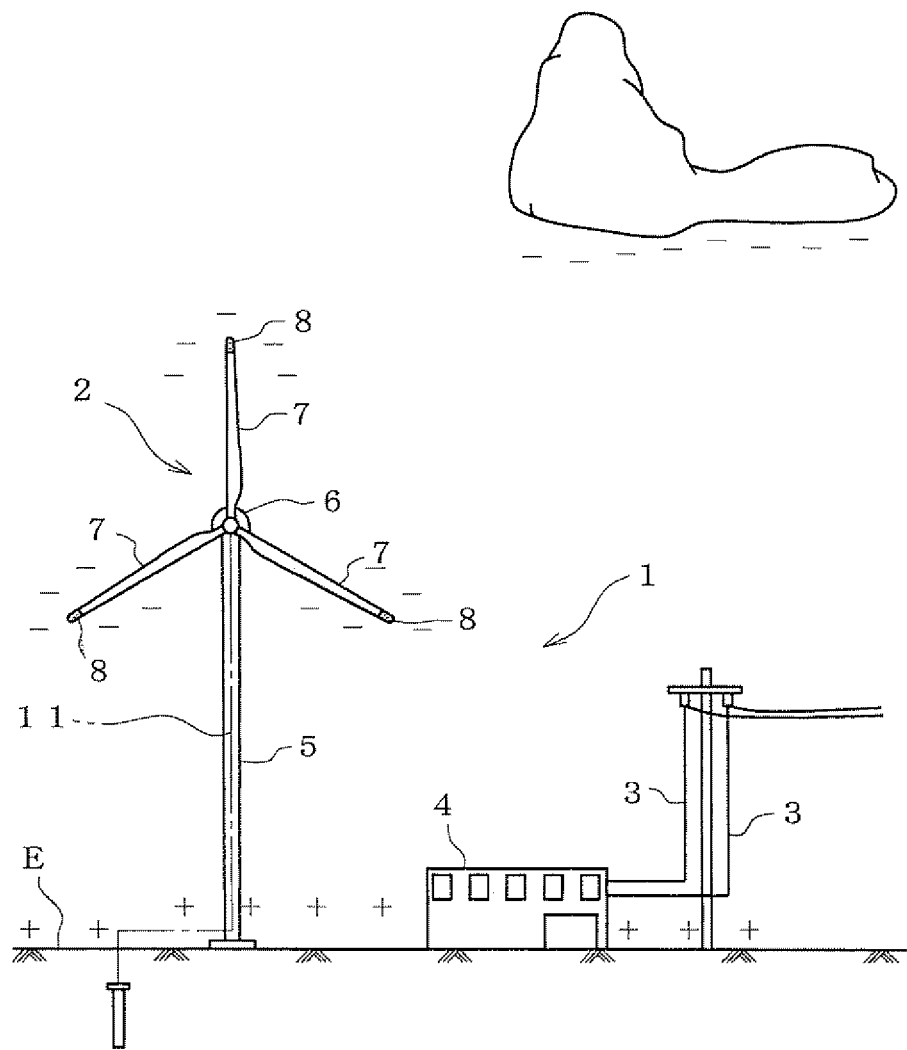
FIG. 1 is a front view illustrating a wind power generation facility according to a first embodiment of the present invention.

In FIG. 1, reference numeral 1 denotes a wind power generation facility according to the present embodiment.

A wind power generation facility 1 of the present embodiment includes a wind turbine 2 that generates power, and a power transmission facility 4 that transmits power generated by the wind turbine 2 via a power transmission line 3.

Figure 2:
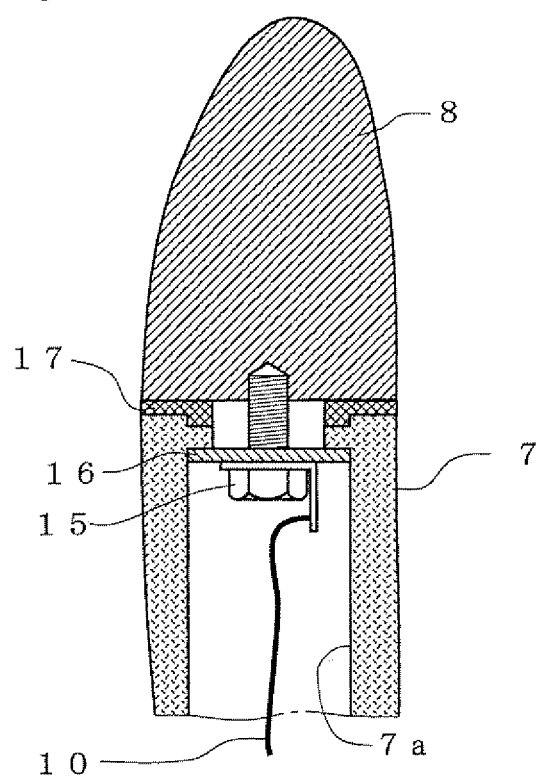
FIG. 2 illustrates a first embodiment of the present invention, and is an enlarged longitudinal section view illustrating a tip portion of a blade.
Figure 3:
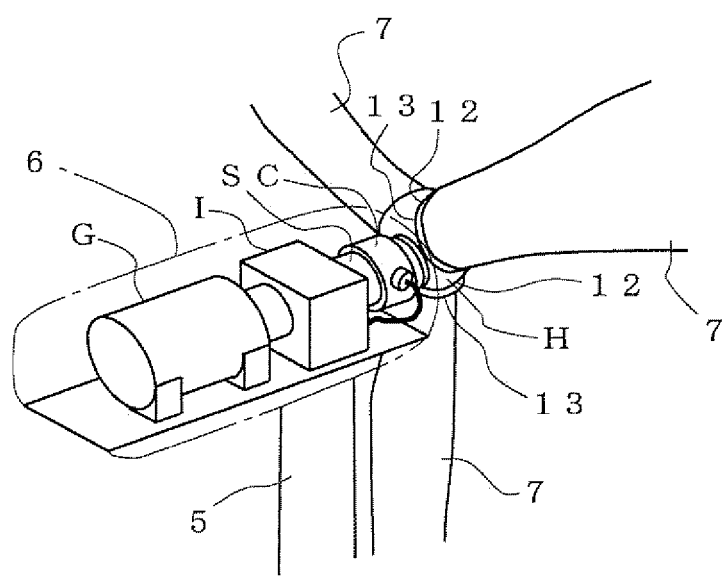
FIG. 3 illustrates a first embodiment of the present invention, and is a perspective view illustrating an upper portion of a wind turbine.

As illustrated in FIGS. 1 to 3, the wind turbine 2 includes a support column 5 erected on the ground E, a generator G, a transmission I, a rotating electrical contact C provided in the middle of a drive shaft S of the transmission I, and a hub H provided at the tip of the drive shaft S, which are provided at an upper portion of the support column 5, a plurality of blades 7 each radially connected to the hub H via a flange, a nacelle 6 provided to cover these (see FIG. 3), charged bodies 8 (see FIG. 2) constituted by part of the blades 7 and attached in an electrically insulated state to connection portions between the hub H and the blades 7 at the tips of the blades 7, and a capacitor 9 (to be described later) provided inside the hub H and supplying charges to the charged body 8.

The charged bodies 8 are electrically connected to one electrode body of the capacitor 9 via electric wires 10 embedded in the blades 7, and the other electrode body of the capacitor 9 is grounded via a grounding wire 11 (see FIG. 1).

The blades 7 are formed of a fiber-reinforced plastic such as glass fiber, and as illustrated in FIG. 3, hollow portions 7a are formed inside the blades 7 over substantially the entire length, further, as illustrated in FIG. 3, flanges 12 are provided at the base of the blades 7, and the flanges 12 are fastened to flanges 13 provided in the hub H with a large number of bolts and nuts (not illustrated), whereby the blades 7 are radially fixed to the hub H.

The charged bodies 8 provided at the tips of the blades 7 are attached to the tips of the blades 7 via electrical insulators 17, and are fixed to the blades 7 in an electrically insulated state by lock bolts 15 penetrating the electrical insulators 16 hooked to the inside of the blades 7.

Further, the lock bolts 15 electrically connect the electric wires 10 to the charged bodies 8 by sandwiching and fixing one end portions of the electric wires 10 with the electrical insulators 16.

Figure 4:
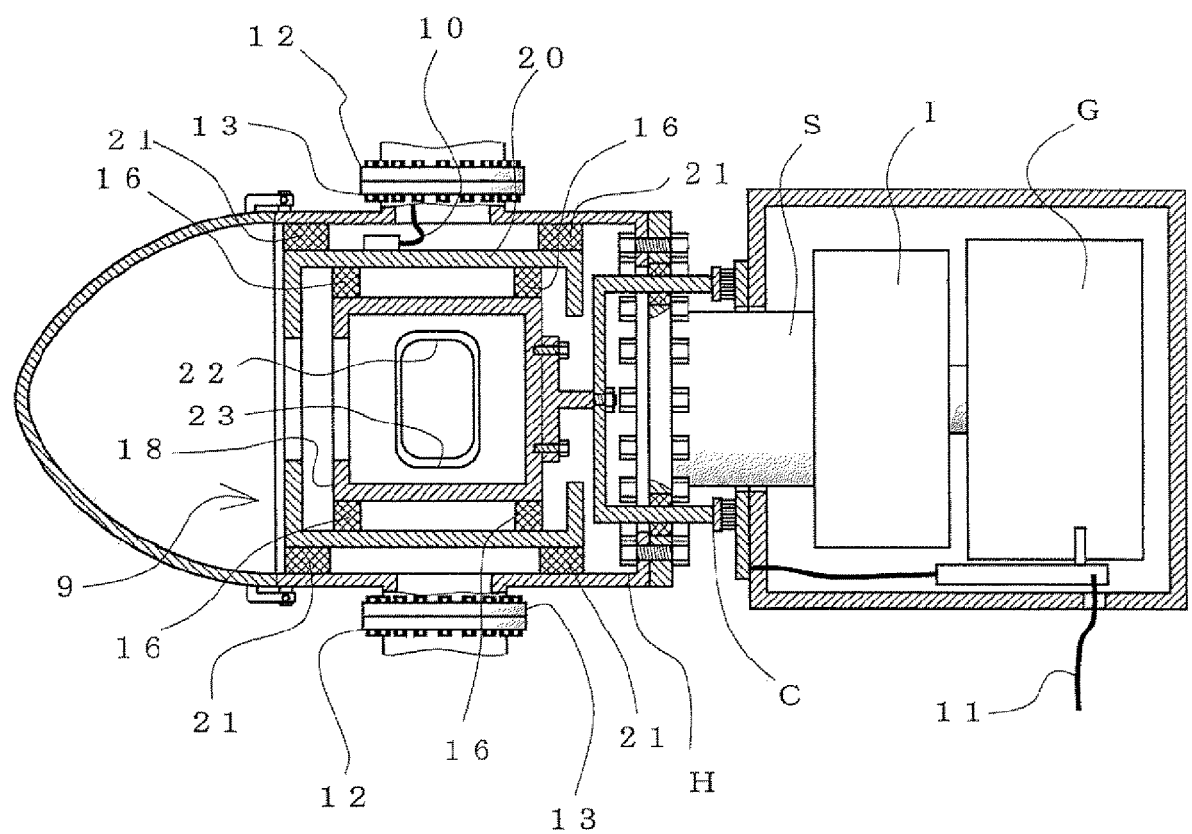
FIG. 4 is a longitudinal section view of a main part illustrating the first embodiment of the present invention.

As illustrated in FIG. 4, the capacitor 9 is incorporated in the inner space of the hub H concentrically with the hub H.

This capacitor 9 includes a first electrode body 18 and a second electrode body 20 that have single cylinder shapes formed of a conductive material, electrical insulators 16 formed of an insulating material and connecting the electrode bodies 18 and 20 at a predetermined interval, and spacers 21 formed of an insulating material and fixing the electrode bodies 18 and 20 to the hub H.

The first electrode body 18 and the second electrode body 20 are formed in cylindrical shapes from a conductive material, the first electrode body 18 is formed to have a diameter smaller than the diameter of the second electrode body 20, and the electrode bodies 18 and 20 are fixed by interposing the electrical insulators 16 therebetween so as to be held at a predetermined interval such that the axes thereof coincide with each other.

In addition, the spacers 21 are attached to the outer periphery of the second electrode body 20, and the spacers 21 are fixed to the inner surface of the hub H using bolts, an adhesive, or the like, so that the electrode bodies 18 and 20 are mounted in the inner space of the hub H.

The central axes of the first electrode body 18 and the second electrode body 20 mounted in this manner are aligned with the rotation axis of the drive shaft S.

Further, a rotating electrical contact C is attached to the first electrode body 18, and is electrically connected to a grounding wire 11 through the rotating electrical contact C.

In addition, the second electrode body 20 is electrically connected to the electric wires 10 electrically connected to the charged bodies 8, and is thus electrically connected to the charged bodies 8.

Meanwhile, inspection ports 22 through which the inside thereof and the outside of the capacitor 9 communicate with each other are formed on the side surfaces of the first electrode body 18 and the second electrode body 20.

The first electrode body 18 and the second electrode body 20 assembled in this manner constitute the capacitor 9 of the present embodiment.

In the wind power generation facility 1 according to the present embodiment configured in this manner, wind energy is converted into rotational motion by the plurality of blades 7, and the generator G is driven by the rotational motion to generate power.

Then, as illustrated in FIG. 1, when a thundercloud in which negative charges are distributed on the cloud bottom approaches, charges (positive charges) opposite to the negative charges are distributed on the surface of the ground E, and the first electrode body 18 of the capacitor 9 that is grounded is also charged with positive charges.

Accordingly, the second electrode body 20 facing the first electrode body 18 with the electrically insulating layer (air layer in the present embodiment) interposed therebetween is negatively charged by the action of the capacitor 9.

In addition, the charged bodies 8 electrically connected to the second electrode body 20 and held in an electrically insulated state with respect to the ground E are also negatively charged.

As described above, when the charged bodies 8 are negatively charged, areas in which negative charges are distributed are formed around the tips of the blades 7, that is, in an upper portion the wind power generation facility 1, and the charged bodies 8 face the negative charges distributed on the cloud bottom of the thundercloud.

As a result, the upward streamer from the vicinity of the tip of the blade 7 positioned highest is less likely to be generated, and the lightning strike on the blade 7 and the surroundings thereof is suppressed.

In the present invention, the capacitor 9 constituting the main part of the device for suppressing the generation of the pick-up discharge described above is installed in the inner space of the hub H.

Here, since the inner space of the hub H is usually a dead space, it is possible to install the device without providing a new installation space.

Further, installation can be performed without processing the blade.

Furthermore, since the device for suppressing lightning strike can be positioned on the rotation center line of the drive shaft S rotated by the hub H, that is, the blades 7, the rotation center of the device and the rotation center of the drive shaft can be easily matched.

As a result, rattling of the drive shaft S caused by the deviation of the center of gravity of the device from the center of gravity of the drive shaft S can be suppressed, and the rotation of the blades 7 about the drive shaft S as the rotation center can be made smooth.

As a result, it is possible to ensure a lightning strike suppression effect while preventing a decrease in the energy conversion efficiency of the blades 7, that is, a decrease in the power generation efficiency.

In addition, since the capacitor 9 can be incorporated without changing the shape of the blades 7, it is possible to improve productivity and suppress an increase in the cost of the wind power generation facility 1.

Figure 5:
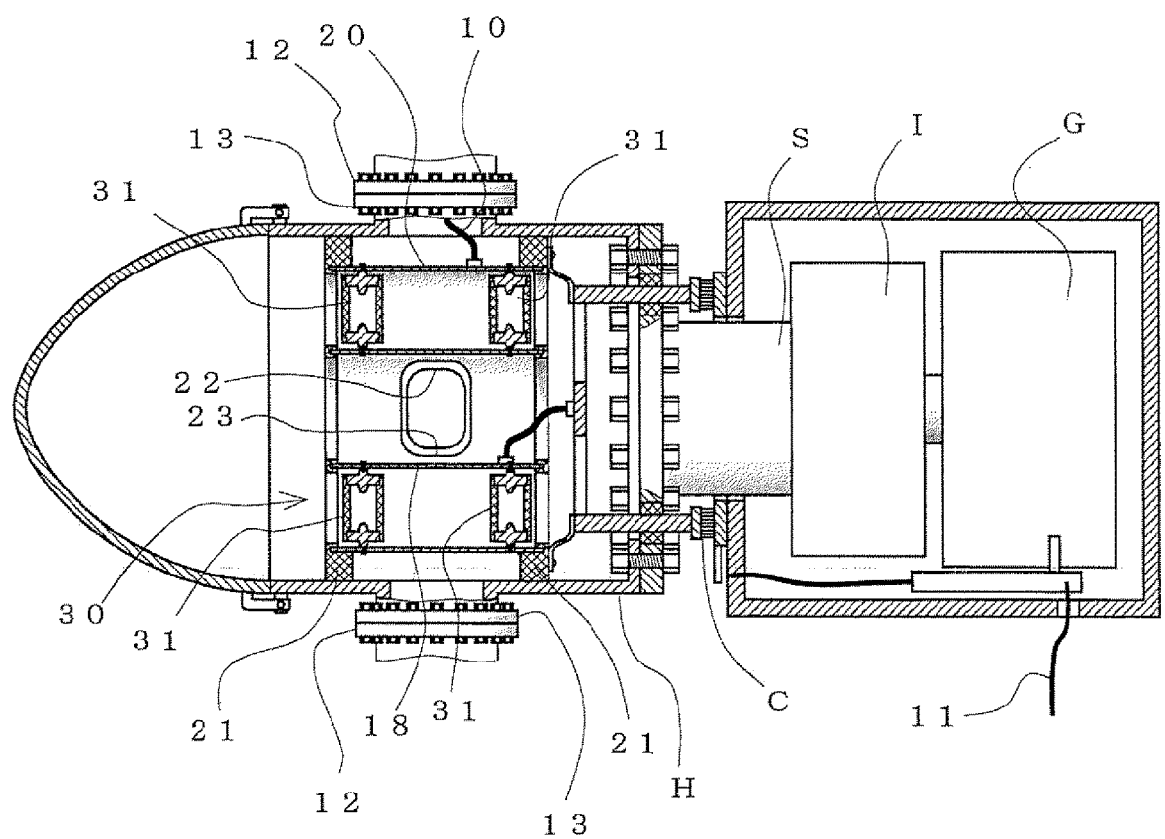
FIG. 5 is a longitudinal section view of a main part illustrating a second embodiment of the present invention.
Figure 6:
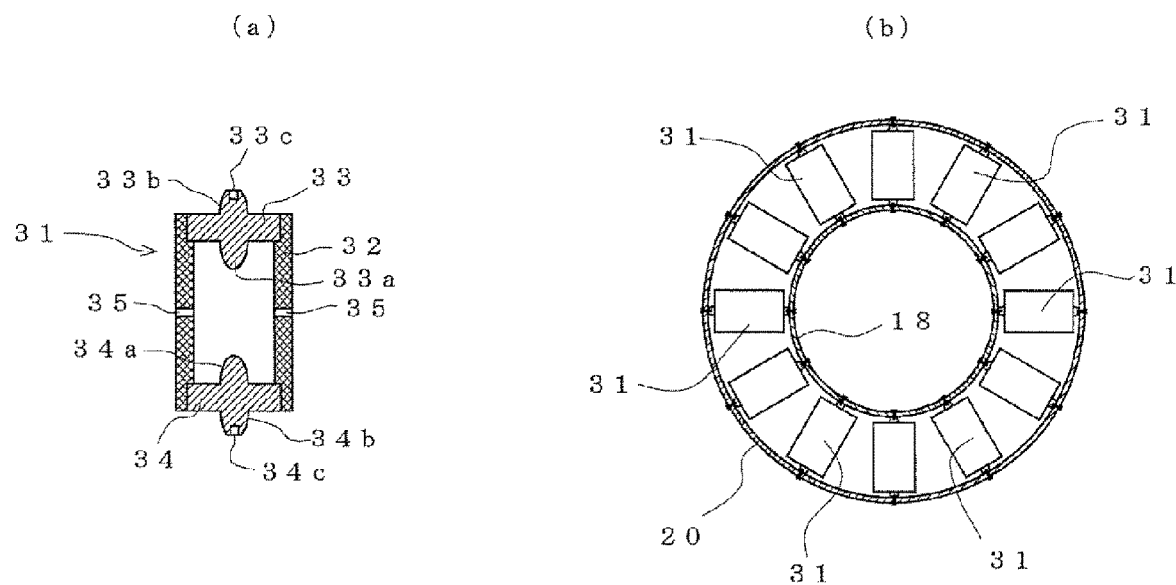
FIG. 6 illustrates the second embodiment of the present invention, in which (a) is a longitudinal section view of a unit capacitor, and (b) is a longitudinal section view of the capacitor.

FIGS. 5 and 6 illustrate a second embodiment of the present invention, in which the capacitor 30 is modified.

In the present embodiment, the capacitor 30 is constituted by using unit capacitors 31 which are disposed between the first electrode body 18 and the second electrode body 20 and connect the electrode bodies 18 and 20 while maintaining an interval therebetween.

As illustrated in FIG. 6(*a*), this unit capacitor 31 includes a cylindrical holding body 32 formed of an electrically insulating material such as ceramics, and a unit electrode body 33 and a unit electrode body 34 provided at an upper end and a lower end of the holding body 32.

The holding body 32 is formed in a cylindrical shape, and an explosion-proof ventilation port 35 is provided in a peripheral wall thereof. The unit electrode bodies 33 and 34 are formed of a conductive metal, and protrusions 33*a*, 33*b*, 34*a*, and 34*b* are provided on upper and lower surfaces thereof, respectively. The protrusions 33*b* and 34*b* are provided with screw holes 33*c* and 34*c*, respectively.

As illustrated in FIGS. 5 and 6(*b*), a plurality of the unit capacitors 31 are radially arranged in a space portion formed between the first electrode body 18 and the second electrode body 20. Further, the outer unit electrode bodies 33 are screwed to the second electrode body 20, and the inner unit electrode bodies 34 are screwed to the first electrode body 18, so that the electrode bodies 18 and 20 are fixed concentrically and at predetermined interval to constitute the capacitor 30.

In the capacitor 30 of the present embodiment, the electrostatic capacitance obtained by the unit capacitors 31 can be added to the electrostatic capacitance obtained by the first electrode body 18 and the second electrode body 20 to increase the electrostatic capacitance, and the unit capacitors 31 can be effectively disposed in the air layer formed between the first electrode body 18 and the second electrode body 20. Furthermore, the weight of the unit capacitors can be easily and uniformly distributed around the rotation center of the drive shaft S, and the rotation of the blades 7 and the drive shaft S can be made smooth.

Figure 7:
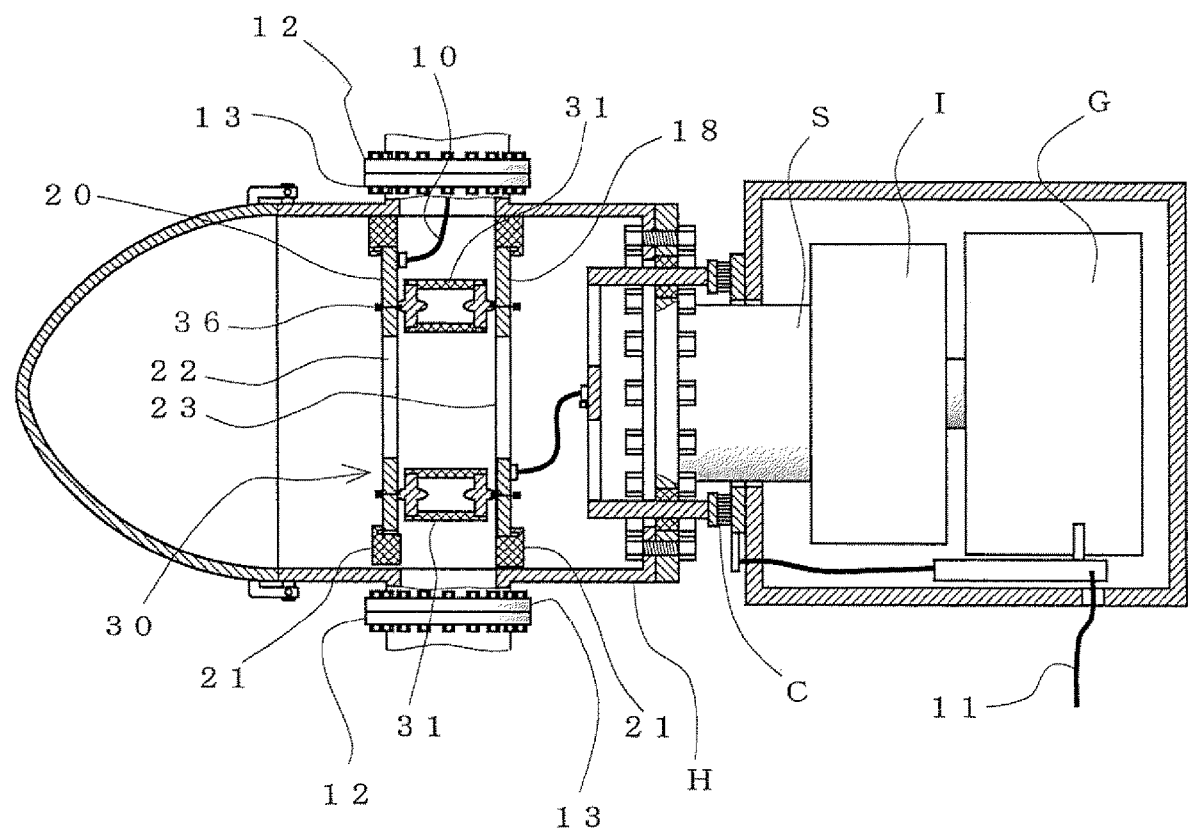
FIG. 7 is a longitudinal section view illustrating a third embodiment of the present invention.

FIG. 7 is a longitudinal section view similar to FIG. 5, illustrating a third embodiment of the present invention. To be noted, in the drawing, the same constituents as those in FIG. 5 are denoted by the same reference signs to simplify the description.

In this embodiment, an example in which the capacitor 30 has a different structure is illustrated. In this example, two disk-shaped conductive plates are arranged at an interval from each other and are fixed in the hub H via insulators such that one serves as the first electrode body 18 and the other serves as the second electrode body 20. In this case, the disk-shaped first electrode body 18 and second electrode body 20 are preferably disposed coaxially with the drive shaft S as in the illustrated example in terms of rotation balance.

To be noted, by adjusting the position of the center of gravity, the position of the rotation center, and the like of the first electrode body 18 and the second electrode body 20, the electrode bodies 18 and 20 can be formed in not only disk shapes but also rectangular shapes, polygonal shapes, elliptical shapes, or the like.

Also in the structure in which the first electrode body 18 and the second electrode body 20 are disposed in the hub H, a configuration in which a plurality of unit capacitors 31 are disposed between the first electrode body 18 and the second electrode body 20 as illustrated in FIG. 7 can be adopted.

When a plurality of the unit capacitors 31 are disposed as described above, a large number of the unit capacitors can be disposed by employing an annular arrangement about the central axes of the first electrode body 18 and the second electrode body 20. In the drawing, reference numeral 36 denotes fixing bolts of the unit capacitors 31.

Also in this embodiment, it is possible to obtain substantially the same effects as those of the previous embodiments, but in particular, it is possible to produce the capacitor itself simply and at a lower cost.

Note that the shapes, dimensions, and the like of the constituent members described in the above embodiments are merely examples, and can be variously changed according to design requirements, the shape of the blade, and the like.

In addition, in a case where the wind power generation facility is installed on the sea, the support column is erected on the sea floor in a shallow sea, and is erected on a floating body on the sea in a deep sea.

REFERENCE SIGNS LIST 1 wind power generation facility
2 wind turbine 3 power transmission line
4 power transmission facility
5 support column
6 nacelle
7 blade
7a hollow portion
8 charged body
9 capacitor
10 electric wire
11 grounding wire
12 flange
13 flange
15 lock bolt
16 electrical insulator
17 electrical insulator
18 first electrode body
19 electrical insulator
20 second electrode body
21 spacer
22 inspection port
23 inspection port
30 capacitor
31 unit capacitor
32 holding body
33 unit electrode body
33a protrusion
33b protrusion
33c screw hole
34 unit electrode body
34a protrusion
34b protrusion
34c screw hole
35 ventilation port
C rotating electrical contact
E ground
G generator
H hub
I transmission
S drive shaft

The invention claimed is:

1. A lightning strike suppression type wind power generation facility comprising:
an erected support column;
a generator provided at an upper portion of the support column;
a hub provided on a drive shaft that rotationally drives the generator;
a plurality of blades radially provided to the hub about the drive shaft;
charged bodies provided at tips of the blades; and
a capacitor provided in an inner space of the hub, wherein
the capacitor includes a first electrode body that is grounded and a second electrode body that faces the first electrode body with an electrically insulating layer interposed therebetween and connected to the charged bodies.

2. The lightning strike suppression type wind power generation facility according to claim 1, wherein
the first electrode body and the second electrode body are formed of a conductive material and in cylindrical shapes having different diameters,
the first electrode body and the second electrode body are coaxially arranged, and
the electrically insulating layer is formed between the first electrode body and the second electrode body.

3. The lightning strike suppression type wind power generation facility according to claim 1, wherein
the first electrode body and the second electrode body are each formed of a conductive material and in a plate shape,
the first electrode body and the second electrode body are coaxially arranged, and
the electrically insulating layer is formed between the first electrode body and the second electrode body.

4. The lightning strike suppression type wind power generation facility according to claim 1, wherein a plurality of unit capacitors is disposed between the first electrode body and the second electrode body.

5. The lightning strike suppression type wind power generation facility according to claim 4, wherein
the unit capacitor includes two unit electrode bodies arranged at an interval from each other and an insulating holding body that holds the interval between the unit electrode bodies, and
one of the unit electrode bodies is connected to the first electrode body and the other is connected to the second electrode body.

6. The lightning strike suppression type wind power generation facility according to claim 5, wherein
the unit capacitor includes an insulating cylindrical holding body and two unit electrode bodies provided at respective ends of the cylindrical holding body, and
an air layer is formed between the two unit electrode bodies in the cylindrical holding body.

7. The lightning strike suppression type wind power generation facility according to claim 5, wherein the plurality of unit capacitors is arranged radially between the first electrode body and the second electrode body about a center line thereof.

8. The lightning strike suppression type wind power generation facility according to claim 1, wherein an inspection port communicating with a connection portion between the hub and the blades is formed in the first electrode body and the second electrode body.

* * * * *